United States Patent
Terauchi (12) 
(10) Patent No.: US 6,606,448 B1
(45) Date of Patent: Aug. 12, 2003

(54) TIME LAPSE RECORDING/REPRODUCING DEVICE THAT PROVIDES FOR BOTH CONTINUOUS RECORDING AND INTERMITTENT RECORDING SIMULTANEOUSLY

(75) Inventor: Ikuo Terauchi, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/331,714

(22) PCT Filed: Oct. 29, 1998

(86) PCT No.: PCT/JP98/04903
§ 371 (c)(1),
(2), (4) Date: Jun. 25, 1999

(87) PCT Pub. No.: WO99/23823
PCT Pub. Date: May 14, 1999

(30) Foreign Application Priority Data

Oct. 30, 1997 (JP) .............................................. 9-298070

(51) Int. Cl.[7] ................................................ H04N 5/91
(52) U.S. Cl. ......................... 386/46; 386/124; 386/125; 386/126; 348/152; 360/5
(58) Field of Search ........................ 386/46, 125, 124, 386/109, 1, 33, 45; 360/5; 348/152, 153, 154, 155; H04N 5/91

(56) References Cited

U.S. PATENT DOCUMENTS 5,724,475 A * 3/1998 Kirsten ....................... 386/109
5,999,690 A * 12/1999 Ro ................................ 386/46
6,167,186 A * 12/2000 Kawasaki et al. ............. 386/46
6,442,327 B1 * 8/2002 Yamada et al. ................ 386/46

FOREIGN PATENT DOCUMENTS

| JP | 4-269086 | 9/1992 |
| JP | 8-186791 | 7/1996 |
| JP | 9-46638 | 2/1997 |
| JP | 10-174088 | 6/1998 |

* cited by examiner

*Primary Examiner*—Vincent Boccio
(74) *Attorney, Agent, or Firm*—McDermott, Will & Emery (57) ABSTRACT

With a time lapse recording/reproducing device for applying time lapse recording/reproducing processing to a video image signal gained through a video surveillance system and the like, a recording control unit (14) performs controlling by giving directions so that a signal obtained by applying picture compression processing to an inputted video signal in a picture compression/expansion circuit (11) provided with a means for intra, frame picture compression/expansion processing is recorded on rigid platters of a hard disk driver (12) as a moving picture and at the same time the foregoing signal is recorded intermittently on an optical disk of an optical disk driver (13), and, when an alarm signal is inputted, the foregoing signal is recorded on the rigid platters for a predetermined period of time as a moving picture and then has the recording operation ended, thus realizing a time lapse recording/reproducing device, whereby recorded moving pictures of the scenes just before and after the time when an alarm signal is inputted and also intermittently recorded pictures covering a long period can be obtained.

19 Claims, 5 Drawing Sheets

TIME LAPSE RECORDING/REPRODUCING DEVICE THAT PROVIDES FOR BOTH CONTINUOUS RECORDING AND INTERMITTENT RECORDING SIMULTANEOUSLY

FIELD OF THE INVENTION

The present invention relates to a time lapse recording/reproducing device, in which a continuous recording and an intermittent recording can be performed simultaneously by combining two record media and, upon receiving a trigger signal inputted from outside, information of the scenes before and after the receipt of the trigger signal can be stored as moving pictures.

BACKGROUND OF THE INVENTION

In a business utilizing a video system, a tape type time lapse recording/reproducing device using a VHS video tape has been generally employed. With the NTSC system, an ordinary home magnetic recording/reproducing device (VTR) has a function of recording/reproducing only moving pictures formed of 30 frames per second. In contrast, a time lapse recording/reproducing device can handle not only a recording of moving pictures but also a recording mode relatively close to a moving video picture formed of several frames per second to a recording mode of one frame for every few seconds or one frame for every few minutes. (The recording operation except for the above recording of moving pictures is referred to as an intermittent recording hereafter.) When the video images recorded according to the foregoing intermittent recording are reproduced, the resulting video images look like jerky ones with frame-by-frame advance. Conversely, however, one reel of tape can record video images for tens to hundreds of hours, thus making it possible to record video images for long hours.

Because of this feature, a time lapse recording/reproducing device is widely used in banks, post offices, convenient stores and the like for a security purpose, and also in railway stations, street intersections and the like for watching and studying the movement of humans and vehicles. Particularly, demands from the security industry for the time lapse recording/reproducing device are high.

The time lapse recording/reproducing device uses the same reel of tape repeatedly while performing an intermittent recording in normal times. When the end of the reel of tape is reached in video image recording, the reel of tape is automatically rewound to the beginning of tape and the recording process is resumed. As a result, video images can be stored on the tape for tens to hundreds of hours going back to the past from the present time although the video images are intermittent.

One of the functions required of a time lapse recording/reproducing device for the security industry is provision for an alarm input signal tapped off from an external trigger terminal. There will be no particular problems as long as video images are recorded intermittently under normal circumstances. However, when an emergency situation such as a burglary and the like occurs, it is most desirable to record the scene in question in detail. In order to cope with this requirement, many time lapse recording/reproducing devices are provided with an external input terminal and when a trigger signal is inputted to an alarm terminal of the external input terminal, the intermittent recording is automatically switched to a recording of moving pictures. The alarm input signal to be inputted to the alarm terminal is usually linked to an emergency bell, alarm button and the like.

The time lapse recording/reproducing device as described in the above, however, has problems as follows: Since a moving picture recording takes place after an alarm signal has been inputted, the moving pictures of the scenes in question are recorded in detail thereafter, but the scenes before the alarm signal is inputted remain as the video images recorded intermittently. It is needless to say that, if moving pictures before the alarm signal are available, the recorded moving pictures contribute greatly to the solution of an incident and the like. However, this is usually impractical since there is no telling when an alarm signal will be inputted. Furthermore, when an alarm signal is inputted, the reel of tape might be near the end of the reel or the reel might be in the process of rewinding. In these cases, the tape might be ended soon after the recording is switched to a moving picture recording or the recording is not performed at all or the like, thus resulting in a serious problem.

SUMMARY OF THE INVENTION

The present invention deals with the foregoing problems and provides a time lapse recording/reproducing device improved in such a way that, while performing a normal intermittent video image recording, once an alarm signal as described in the above is inputted, moving pictures of the scenes before and after the alarm signal is inputted are reliably recorded.

In resolving the problems as described in the above, a time lapse recording/reproducing device of the present invention is provided with:

a picture compression/expansion unit with a means for applying an intra frame picture compression/expansion process to a video signal inputted from a video surveillance camera and the like;

a first recording/reproducing unit using a disk like record medium and a second recording/reproducing unit using a record medium that enables the recording for a longer period than the record medium used in the first recording/reproducing unit both being connected with the foregoing picture compression/expansion unit;

a recording control unit to perform controlling by giving directions that a signal outputted and fed from the foregoing picture compression/expansion unit is to be recorded on the record medium of the foregoing first recording/reproducing unit as a moving picture and at the same time to be recorded intermittently on the record medium of the second recording/reproducing unit frame by frame; and an alarm signal generator to feed an alarm signal to the recording control unit, in which, upon feeding an alarm signal from the alarm signal generator, the recording control unit performs controlling by giving directions that the signal fed from the picture compression/expansion unit is to be recorded on the record medium of the first recording/reproducing unit for the duration from the time when the alarm signal was received to a predetermined time and then the recording operation is to be ended.

According to the present invention, a time lapse recording/reproducing device with a new function can be realized, the new function being the capabilities of recording moving pictures of the scenes just before and after an alarm signal is inputted and also performing an intermittent recording for a long period.

In one embodiment the present invention is a time lapse recording/reproducing device provided with:

an input/output circuit to input/output a video signal;

a picture compression/expansion unit with a means for applying an intra-frame picture compression/expansion process to a video signal inputted via the foregoing input/output circuit;

a first recording/reproducing unit using a disk like record medium and a second recording/reproducing unit using a record medium that enables the recording for a longer period than the above record medium, both being connected with the foregoing picture compression/expansion unit;

a recording control unit to perform controlling by giving directions that a signal fed from the picture compression/expansion unit is to be recorded on the record medium of the first recording/reproducing unit as a moving picture and at the same time to be recorded intermittently on the record medium of the second recording/reproducing unit; and an alarm signal generator to feed an alarm signal to the recording control unit, in which, upon feeding an alarm signal from the alarm signal generator, the recording control unit performs controlling by giving directions that the signal fed from the picture compression/expansion unit is to be recorded on the record medium of the first recording/reproducing unit for the duration from the time when the alarm signal was received to a predetermined time and then the recording operation is to be ended, thereby making it possible to realize a time lapse recording/reproducing device with a new function of recording moving pictures of the scenes just before and after an alarm signal is inputted and also performing an intermittent recording for a long period.

In another embodiment the present invention is a time lapse recording device provided with:

an input circuit to input a video signal;

a picture compression unit with a means for applying an intra-frame picture compression process to a video signal inputted via the foregoing input circuit;

a first recording/reproducing unit using a disk like record medium and a second recording/reproducing unit using a record medium that enables the recording for a longer period than the above record medium, both being connected with the foregoing picture compression unit;

a recording control unit to perform controlling by giving directions that a signal fed from the foregoing picture compression unit is to be recorded on the record medium of the first recording/reproducing unit as a moving picture and at the same time to be recorded intermittently on the record medium of the second recording/reproducing unit; and an alarm signal generator to feed an alarm signal to the recording control unit, in which, upon feeding an alarm signal from the alarm signal generator, the recording control unit performs controlling by giving directions that the signal fed from the picture compression unit is to be recorded on the record medium of the first recording/reproducing unit for the duration from the time when the alarm signal was received to a predetermined tirre and then the recording operation is to be ended, thereby making it possible to realize a time lapse recording device with a new function of recording moving pictures of the scenes just before and after an alarm signal is inputted and also performing an intermittent recording for a long period in the same way as the invention described in the prior embodiment.

In a variation of the prior embodiment, the invention is the time lapse recording/reproducing device, in which the picture compression/expansion unit is a picture compression/expansion unit of JPEG (Joint Photographic coding Experts Group) system and a video signal put through a picture compression process according to the JPEG system is recorded on each respective record medium of the foregoing first recording/reproducing unit and second recording/reproducing unit.

In another variation of the prior embodiment, the invention is the time lapse recording/reproducing, in which the picture compression/expansion unit is a picture compression/expansion unit of MPEG (Moving Picture coding Experts Group) system and a video signal put through a picture compression process according to the MPEG system is recorded on each respective record medium of the foregoing first recording/reproducing unit and second recording/reproducing unit.

In a variation of the second embodiment identified above, the invention is the time lapse recording device, in which the picture compression unit is a picture compression unit of JPEG system and a video signal put through a picture compression process according to the JPEG system is recorded on each respective record medium of the foregoing first recording/reproducing unit and second recording/reproducing unit.

In another variation of the second embodiment identified above, the invention is the time lapse recording device, in which the picture compression unit is a picture compression unit of MPEG system and a video signal put through a picture compression process according to the MPEG system is recorded on each respective record medium of the foregoing first recording/reproducing unit and second recording/reproducing unit.

In another variation, the invention is the time lapse recording/reproducing device as described in the first embodiment or the time lapse recording device as described in the second embodiment, in which the foregoing first recording/reproducing unit uses a hard disk drive employing rigid platters as the record medium, thereby making it possible to perform a continuous recording almost without interruption to gain moving pictures by utiilizing the high speed accessibility.

In yet another variation, the invention is a time lapse recording/reproducing device in accordance with the foregoing embodiments, in which the foregoing second recording/reproducing unit uses an optical disk drive employing an optical disk as the record medium, thereby realizing an intermittent video image recording for a long period.

In yet another variation, the invention is a time lapse recording/reproducing device in accordance with the foregoing embodiments, in which the foregoing second recording/reproducing unit uses a video tape recorder employing a video tape as the record medium, thereby realizing an intermittent video image recording for a long period.

In yet another variation, the invention is a time lapse recording/reproducing device in accordance with the foregoing embodiments, in which the foregoing recording control unit performs controlling by giving directions that a one frame portion of the signal fed from the picture compression/expansion unit to the second recording/reproducing unit is to be recorded on the record medium of the second recording/reproducing unit for every periodicity or every time interval corresponding to an integral multiple of the periodicity of the frame synchronization signal fed to the recording control unit, thereby making it possible to perform an intermittent recording on the record medium of the second recording/reproducing unit.

In yet another variation, the invention is a time lapse recording device in accordance with the foregoing embodiments, in which the foregoing recording control unit performs controlling by giving directions that a one frame portion of the signal fed from the picture compression/expansion unit to the second recording/reproducing unit is to be recorded on the record medium of the second recording/reproducing unit for every periodicity or every time interval corresponding to an integral multiple of the periodicity of the frame synchronization signal fed to the recording control unit,.thereby making it possible to perform an intermittent recording on the record medium of the second recording/reproducing unit.

In yet another variation, the invention is a time lapse recording/reproducing device in accordance with the foregoing embodiments, in which the foregoing recording control unit performs controlling by giving directions that the number of arrivals of the frame signal fed to the recording control unit is to be counted and, when the arrival count has reached a predetermined number, a one frame portion of the signal fed from the picture compression/expansion unit to the second recording/reproducing unit is to be recorded on the record medium of the second recording/reproducing unit, thereby making it possible to perform an intermittent recording on the record medium of the second recording/reproducing unit.

In yet another variation, the invention is a time lapse recording device in accordance with the foregoing embodiment, in which the foregoing recording control unit performs controlling by giving directions that the number of arrivals of the frame signal fed to the recording control unit is to be counted and, when the arrival count has reached a predetermined number, a one frame portion of the signal fed from the picture compression/expansion unit to the second recording/reproducing unit is to be recorded on the record medium of the second recording/reproducing unit, thereby making it possible to perform an intermittent recording on the record medium of the second recording/reproducing unit.

In yet another variation, the invention is the time lapse recording/reproducing device in accordance with the foregoing embodiments, in which the foregoing recording control unit performs controlling by giving directions that, according to the output timing information of I frame fed from the picture compression/expansion unit of MPEG system to the recording control unit, the signal of I frame out of the signals fed from the picture compression/expansion unit of MPEG system to the second recording/reproducing unit is to be recorded on the record medium of the second recording/reproducing unit for every periodicity or for every time interval corresponding to an integral multiple of the periodicity, with which the signal of I frame is arranged, thereby making it possible to perform an intermittent recording on the record medium of the second recording/reproducing unit.

In yet another variation, the invention as described is a time lapse recording device in accordance with the foregoing embodiments, in which the foregoing recording control unit performs controlling by giving directions that, according to the output timing information of I frame fed from the picture compression unit of MPEG system to the recording control unit, the signal of I frame out of the signals fed from the picture compression unit of MPEG system to the second recording/reproducing unit is to be recorded on the record medium of the second recording/reproducing unit for every periodicity or for every time interval corresponding to an integral multiple of the periodicity, with which the signal of I frame is arranged, thereby making It possible to perform an intermittent recording on the record medium of the second recording/reproducing unit.

In yet another embodiment, the invention is a time lapse recording/reproducing device in accordance with the foregoing embodiments, in which the foregoing recording control unit performs controlling by giving directions that, according to the output timing information of I frame fed from the picture compression/expansion unit of MPEG system to the recording control unit, the signal of I frame only out of the signals fed from the picture compression/expansion unit of MPEG system to the second recording/reproducing unit is to be recorded on the record medium of the second recording/reproducing unit for every time when the arrival count of I frame has reached a predetermined number, thereby making it possible to perform an intermittent recording on the record medium of the second recording/reproducing unit.

In yet another embodiment, the invention is a time lapse recording device in accordance with the foregoing embodiments, in which the foregoing recording control unit performs controlling by giving directions that, according to the output timing information of I frame fed from the picture compression/expansion unit of MPEG system to the recording control unit, the signal of I frame only out of the signals fed from the picture compression/expansion unit of MPEG system to the second recording/reproducing unit is to be recorded on the record medium of the second recording/reproducing unit for every time when the arrival count of I frame has reached a predetermined number, thereby making it possible to perform an intermittent recording on the record medium of the second recording/reproducing unit.

In yet another embodiment, the invention is a time lapse recording/reproducing device in accordance with the foregoing embodiments, in which the foregoing recording control unit performs controlling by giving directions that a signal fed from the picture compression/expansion unit is to be recorded on the record medium of the first recording/reproducing unit from the time when the alarm signal is received to the time when the predetermined time reaches one half of the maximum allowable recording time of the first recording/reproducing unit and then the recording operation is to be ended, thereby making it possible to record and maintain moving pictures of the scenes before and after an alarm signal is received on the record medium of the first recording/reproducing unit.

In yet another embodiment, the invention as described is a time lapse recording device in accordance with the foregoing embodiments, in which the foregoing recording control unit performs controlling by giving directions that a signal ted from the picture compression unit is to be recorded on the record medium of the first recording/reproducing unit from the time when the alarm signal is received to the time when the predetermined time reaches one half of the maximum allowable recording time of the first recording/reproducing unit and then the recording operation is to be ended, thereby making it possible to record and maintain moving pictures of the scenes before and after an alarm signal is received on the record medium of the first recording/reproducing unit.

PREFERRED EMBODIMENTS OF THE PRESENT INVENTION

Figure 1:
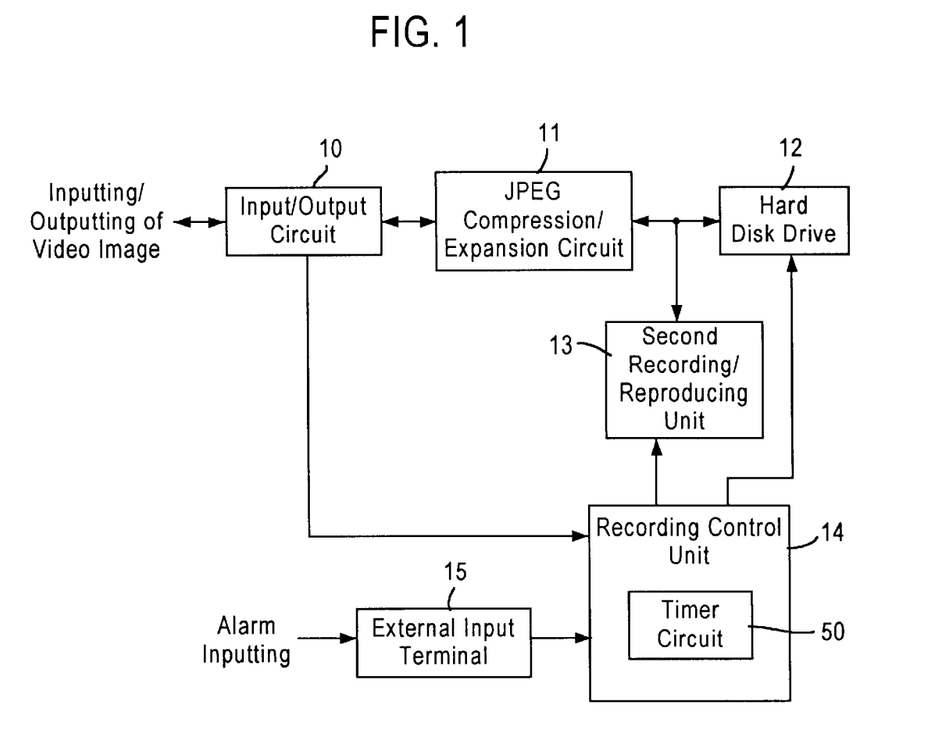
FIG. 1 is a block diagram of a time lapse recording/reproducing device in an exemplary embodiment of the present invention.

Next, an exemplary embodiment of the present invention will be described with reference to FIG. 1. In FIG. 1, a video image signal from a video camera and the like is inputted to an input/output circuit 10. This video image signal is fed to a JPEG compression/expansion circuit 11 employing a JPEG system, which is an intra-frame compression method, thereby applying an intra-frame compression process to the video image signal. The video image signal that was intra-frame compressed in the JPEG compression/ expansion circuit 11 is fed to a hard disk drive 12 serving as a first video image signal recording/reproducing unit and an optical disk drive 13 serving as a second video image signal recording/reproducing unit, thereby recording the video image signal on a rigid platter and an optical disk, respectively, according to the controlling of respective control signals led from a recording control unit 14. In other words, by making the recording control unit 14 give a direction of continuous recording to the hard disk drive 12 and a direction of intermittent recording to the optical disk drive 13, a continuous recording can be performed on rigid platters and at the same time an intermittent recording can be performed on an optical disk.

The hard disk drive 12 is featured to have high-speed accessibility and allowed to perform a repeated recording by having the head thereof returned to the beginning upon shifting the position of the head, thus requiring no rewinding as required of a tape. Since the recording data rate is high, the use of a video picture compression method reduces the amount of data, thereby making it possible to record moving pictures almost without interruption as if, using an endless tape. Therefore, this hard disk drive 12 can not be replaced by a video tape recorder and by an optical disk driver, which takes a long time in head shifting and shows a relatively low recording data rate. Since a fixed memory unit is expensive and, with the intra-frame compression method having a low compression ratio, it can perform a recording only for a short period, the fixed memory unit does not serve the purpose.

As described in the above, the hard disk drive 12 and optical disk drive 13 perform respective recordings simultaneously, and suppose rigid platters of a hard disk drive keeps a record of a 30 minute moving picture and an optical disk of an optical disk drive keeps an intermittent record of one week's data, respectively, then immediately after these recordings, moving pictures corresponding to the period of 30 minutes retroactive from the above point of time remains as a record on the foregoing rigid platters and data for the period of one week retroactive from the above point of time remains as a record on the foregoing optical disk.

The information of an alarm signal is fed to the recording control unit 14 via an external input terminal 15. Upon having received this information, the recording control unit 14, the performance of which will be described in detail later, has the recording operation of the hard disk drive 12 terminated in 15 minutes after a timer is activated when the period recordable on the rigid platters of the hard disk driver 12 is 30 minutes and the setting time of the timer is adjusted to 15 minutes equaling to one half of the above recordable period of 30 minutes. Thus, moving pictures of the scenes before and after the time, when an alarm signal is inputted, are recorded for 15 minutes on the rigid platters of the hard disk driver 12 and at the same time the information of an intermittent recording for a long period can also be recorded on the optical disk of the optical disk driver 13.

Figure 4:
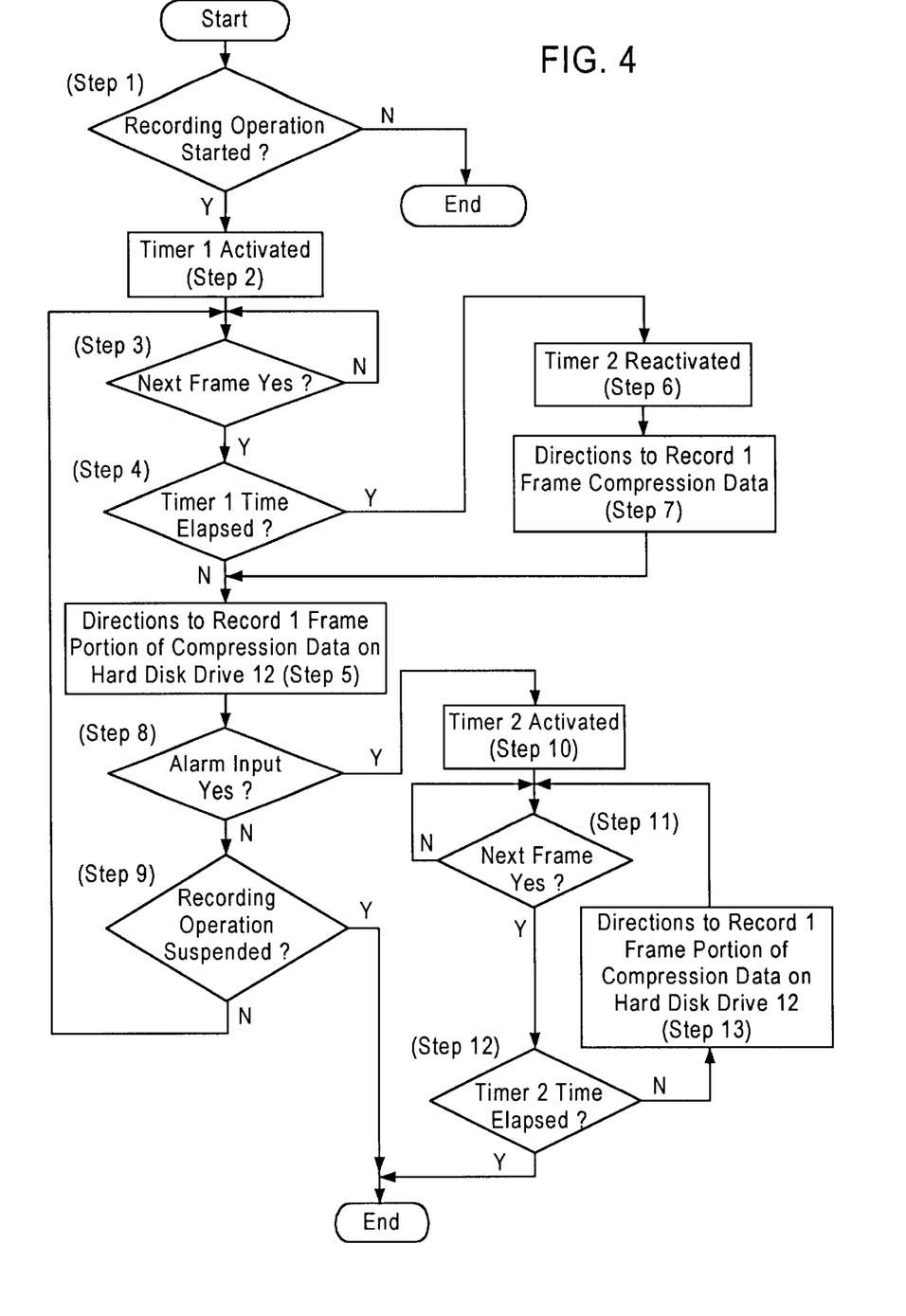
FIG. 4 is a flow chart showing how the time lapse recording/reproducing device of the present invention shown in the block diagram of FIG. 1 operates.

Here, a more detailed description will be made on the function of the recording control unit 14 of FIG. 1 in an exemplary embodiment of the present invention. This recording control unit 14 can be formed of hardware but also can be realized by using a microprocessor. A flow chart of the software of the microprocessor used as the recording control unit 14 is shown in FIG. 4.

Next, the operational function of the recording control unit 14 will be described with reference to FIG. 4.

First, before a recording operation is started, the recording control unit 14 makes a judgement on whether a recording operation is to be started or not. (Step 1) Usually the recording operation is initiated by an operational switch although this switch is not shown in FIG. 1. When the recording operation is started (Y side of Step 1), a timer 1 of a timer circuit 50 as shown in FIG. 1 is activated. (Step 2) This timer 1 is for recording intermittently the picture compression data fed to the optical disk driver 13 of FIG. 1 from the JPEG compression/expansion circuit 11.

Since the JPEG compression/expansion circuit 11 applies picture compression data processing to an inputted video image signal frame by frame, the recording direction operation can also be performed frame by frame for the video image signal, thereby needing timing to be taken through the use of a frame signal of the inputted video image signal. Therefore, a frame waiting process is performed in Step 3 to wait for the frame signal to be inputted. A frame signal is fed to a recording control unit 14 from an input/output circuit 10 as shown in FIG. 1, for example.

During the frame waiting process, the lapse of time of the foregoing timer 1 is checked when the next frame signal is inputted (Y side of Step 3). (Step 4) When a predetermined time has not yet elapsed (N side of Step 4), directions are given to record a picture I compression data for one frame in the hard disk driver 12 only. (Step 5) On the other hand, when the time lapse of the timer 1 has exceeded the predetermined time (Y side of Step 4), the timer 1 is reactivated (Step 6) and at the same time directions are given to record a picture compression data for one frame on the optical disk 12 (Step 7) and also to perform a one frame recording with the hard disk drive 12. (Step 5) Accordingly, moving pictures are recorded on the rigid platters of the hard disk drive 12 and video images are recorded intermittently on the optical disk of the optical disk drive 13.

As described in the above, when recordings of a one frame portion on the optical disk (Step 7) and on the rigid platters (Step 5) are finished according to the judgment made in Step 4 on whether N side or Y side, the existence of an alarm signal inputted via the external terminal 15 is checked. (Step 8) When there is no alarm signal inputted, a further checking is made on whether the recording operation is suspended or not. (Step 9) When directions are given to suspend the recording operation by means of an operational button and the like (Y side of Step 9); the recording operation is stopped. When directions are given not to suspend the recording operation (N side of Step 9), the process returns to Step 3 of FIG. 4 in order to perform a recording of the next frame.

In the process of checking at Step 8 in FIG. 4, when there exists an alarm signal inputted (Y side of Step 8), a timer 2 in the timer circuit 50 as shown in FIG. 1 is activated. (Step 10 in FIG. 4)

The foregoing timer 1 can also be used as the timer 2 but the latter is for suspending the recording operation of the hard disk driver 12 and the time for suspension is set to one half of the recording period of the hard disk drive 12.

In Step 10, after the timer 2 is activated and during the frame waiting process in the same way as was in the foregoing Step 3 (Step 11), a lapse of time is being checked whether the foregoing pre-determined time has been reached or not after the timer 2 was activated. (Step 12) When the time lapse of the timer 2 has not reached the predetermined time (N side of Step 12), the compression data continue to be recorded as moving pictures on the rigid platters of the hard disk drive 12 until the lapse of time reaches the predetermined time. (Step 13) On the other hand, at the time when the time lapse of the timer 2 has reached the predetermined time (Y side of Step 12), the recording operation is terminated.

Thus, as described in an exemplary embodiment of the present invention with reference to FIG. 1 and FIG. 4, moving pictures of the scenes can be recorded on the rigid platters of the hard disk drive 12 during the period before and after the time when an alarm signal is inputted, and at the same time video images can be recorded intermittently for a long period on the optical disk of the optical disk drive 13.

Furthermore, although the intermittent recording period and the recording period of the hard disk driver 12 before and after the inputting of the alarm signal is controlled by using a timer, the same effect can be achieved by counting the number of the frame signals has been inputted.

Figure 3:
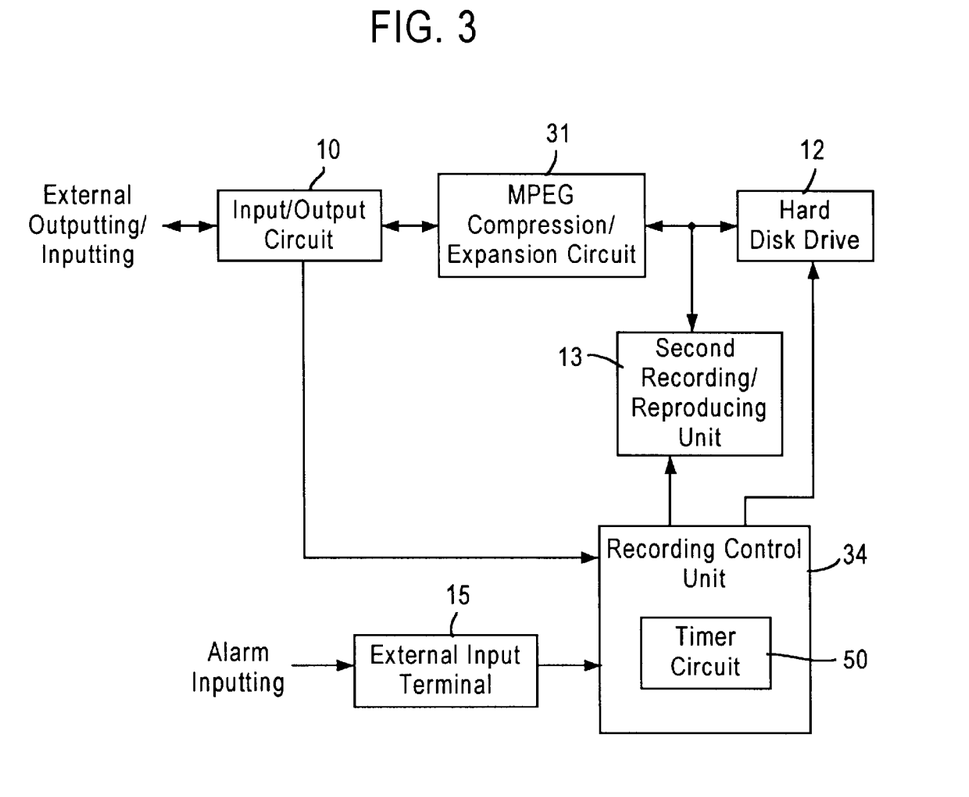
FIG. 3 is a block diagram of a time lapse recording/reproducing device in another exemplary embodiment of the present invention.

FIG. 3 is a block diagram of a time lapse recording/reproducing device in a second exemplary embodiment of the present invention. In FIG. 3, the blocks or elements having the same reference numerals with the ones in FIG. 1 are meant to have the same structures as the blocks or elements as appear in FIG. 1. Video image signals obtained from a video camera and the like are fed to an MPEG compression/expansion circuit 31 via an input/output circuit 10, where the information data of video images are compression processed in accordance with the MPEG system.

For an easier understanding of the descriptions of exemplary embodiments of the present invention, a brief description will be made here about a compression technology of video image information. Television video images are formed of a collection of a freeze-frame picture referred to as a frame. Since a moving picture of NTSC television system is composed of frames continuously reproduced at a rate of 30 frames per second, there is a method of compressing the information for each respective frame, which is referred to as an intra-frame compression system. This system is applicable to both a freeze-frame picture and a moving picture,, and a typical system is the JPEG system, which is included in the ISO Standards. The exemplary embodiment as shown in FIG. 1 uses video image data obtained in accordance with this system.

In addition, there is an MPEG system that deals with moving pictures only. This system is a compression method developed by finding a very close correlation—ship in terms of time between the contents of each respective frame in a moving picture and characterized by setting up a reference frame for each respective certain period, having it frame intra coded (the frame thus compressed is referred to as an I frame) and at the same time having the frames to follow thereafter in succession predictive coded to form frames by compression having the differential data between the reference frame and the frames to follow in succession. (The resulting frame is referred to as a P frame.)

There is a frame called B frame (Bidirectionally Predictive Coded Frame) in the MPEG system in addition to the I frame and P frame, but a description of the B frame is omitted since it is not used id the exemplary embodiments of the present invention.

Figure 2A:
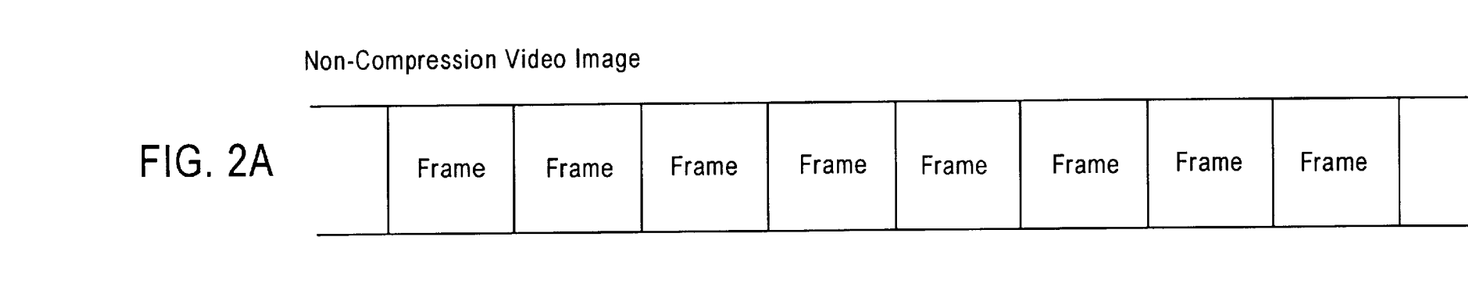
FIG. 2 is a diagrammatic illustration depicting video image data in an MPEG compression system.
Figure 2B:
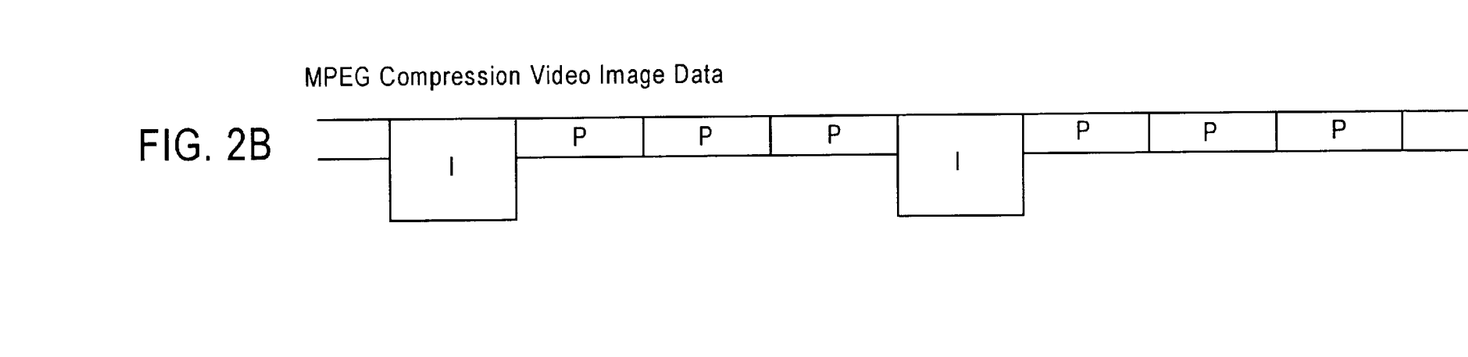

FIG. 2A shows video image data before compression and shows that the video image data is formed of frames. FIG. 2B shows an example of the video image data formed by compressing the video image data of FIG. 2A according to the MPEG system. As seen in FIG. 2B, the I frames are coded (intra-frame compressed) separately from other frames and located periodically. The P frames are formed of differential data from the I frames or by predictive coding of past I frames or P frames. In FIG. 2A and FIG. 2B, the size of each respective rectangle expresses the data size conceptually.

Now, the description of FIG. 3 is resumed. In FIG. 3, the video image signal treated by compression in the foregoing MPEG compression/expansion circuit 31 is fed to the hard disk drive 12 and optical disk drive 13. The hard disk drive 12 is controlled by directions from the recording control unit 34 that the inputted video image signal is to be recorded continuously on the rigid platters. On the other hand, the timing information, by which the I frame data is outputted to the recording control unit 34 from the MPEG compression/expansion circuit 31, is provided, and the optical disk drive 13 is controlled by directions to that the I frame signal only out of the video image signal fed from the MPEG compression/expansion circuit 31 is to be recorded on the optical disk. Thus, video images can be continuously recorded as moving pictures on the rigid platters and at the same time recorded intermittently on the optical disk.

Furthermore, the information of an alarm signal is fed to the recording control unit 34 via the external input terminal 15, but its description is omitted here since the description is the same as the one made about the exemplary embodiment of FIG. 1.

The foregoing recording control unit 34 of the exemplary embodiment in FIG. 3 can be realized by using a microprocessor. A flow chart in that case is shown in FIG. 5 and a description will be made primarily relative to the difference between the flow chart of FIG. 5 and the flow chart of FIG. 4.

Figure 5:
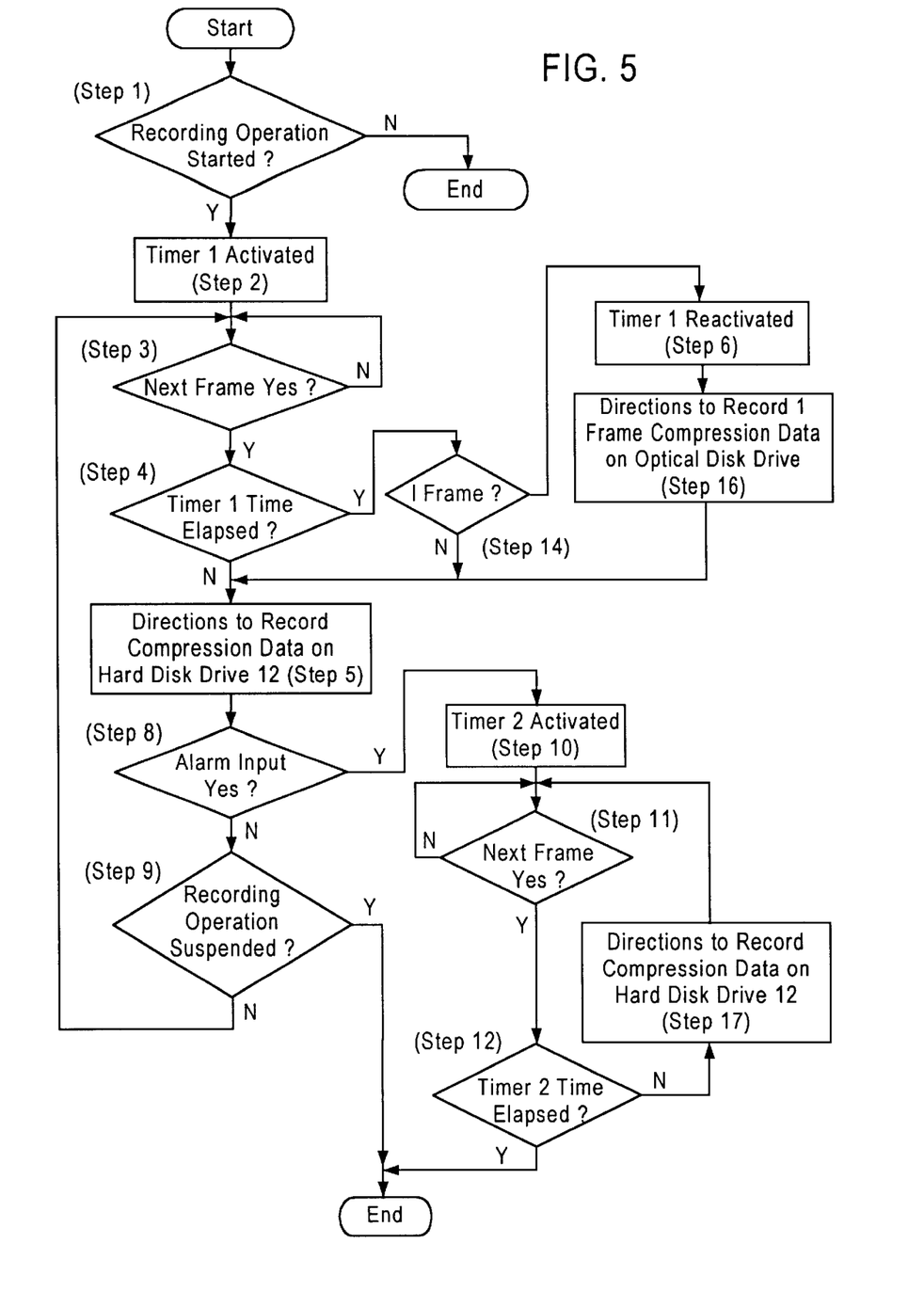
FIG. 5 is a flow chart showing how the time lapse recording/reproducing device of the present invention shown in the block diagram of FIG. 3 operates.

First, in the same way as described relative to FIG. 4, when a recording operation is started in Step 1 of FIG. 5 (Y side of Step 1), the timer 1 of the timer circuit 50 located in the recording control unit 34 is activated (Step 2) and the step of operation goes to Step 3. In Step 3, a frame waiting process is performed in the same way as described relative to FIG. 4. In Step 4, a lapse of time of the timer 1 is checked as described relative to FIG. 4. The function of the timer 1 is effective in recording intermittently picture compression data fed from the MPEG compression/expansion circuit 31 to the optical disk drive 13 of FIG. 3 in the same way as described relative to FIG. 4.

As a result of checking the lapse of time of the timer 1 (Step 4), when a predetermined period is found not to have elapsed (N side of Step 4), directions are given to record a one frame portion of the picture compression data in the hard disk drive 12 only. (Step 15) On the other hand, when the lapse of time of the timer 1 is found to have passed the predetermined period (Y side of Step 4), [th]e step of operation goes to Step 14, where a check is made on whether the frame is an I frame or not. As FIG. 3 shows, since the picture compression signal outputted from the MPEG compression/expansion circuit 31 and fed to the recording control unit 34 carries information to tell whether the frame is an I frame or not, a check is made on whether the frame is an I frame or not by utilizing the foregoing information.

When the frame is not an I frame (N side of Step 4), the step of operation goes to Step 15, where the compression data is recorded only on the rigid platters of the hard disk drive 12 without recording the compression data on the optical disk of the optical disk drive 13. If the frame is an I frame (Y side of Step 14), the timer 1 is reactivated (Step 6) and the compression data of the I frame is recorded on the optical disk of the optical disk drive 13 (Step 16) and then recorded also on the rigid platters of the hard disk drive 12. (Step 15) Thus, the process is repeated for every frame and the MPEG picture compression data are recorded on the rigid platters as moving pictures and also recorded intermittently on the optical disk.

At this time, the time interval between intermittent recordings can be determined by time setting of the timer 1. The I frames are periodically disposed like the compressed picture data of MPEG as shown in FIG. 2B in a simplified format. Therefore, by employing the same time setting as the periodicity, at the interval of which the I frames are disposed, the picture data of all I frames are recorded intermittently on the optical disk. When an integral multiple of the foregoing periodicity is made as the set time, suppose fivefold, for example, then an I frame located at a position corresponding to the fifth frame is to be recorded on the optical disk after a certain I frame has been recorded. Therefore, when the lapse of time of the timer 1 has not yet reached the set time corresponding to an integral multiple of the foregoing periodicity in Step 4 of FIG. 5, the step of operation goes to Step 15 via N side of Step 4 even if the frame is an I frame, and the I frame is recorded only on the rigid platters.

Upon completion of the processing in Step 15, the step of operation goes to Step 8, where a check is made on whether an alarm signal is inputted or not, as described relative to FIG. 4. When an alarm signal is inputted (Y side of Step 8), the timer 2 of the timer circuit 50 in FIG. 3 is activated (Step 10) and the step of operation goes to Step 11 of a frame waiting process. The set time of the timer 2 is made one half of the recording period of the hard disk drive 12 in the same way as before.

In Step 12, when the lapse of time of the timer 2 has not reached the set time (N side of Step 12), the MPEG compression data continue to be recorded as moving pictures on the rigid platters of the hard disk drive 12 until the lapse of time reaches the set time. (Step 17) When the lapse of time of the timer 2 has reached the set time (Y side of Step 12), the recording operation comes to an end in the same way as before.

As described in the above with reference to FIG. 3 and FIG. 5, a time lapse recording/reproducing device in a second exemplary embodiment of the present invention records moving pictures of the scenes, before and after the time when an alarm signal is inputted, on the rigid platters of the hard disk drive 12 and at the same time can record video images intermittently for a long period on the optical disk of the optical disk drive 13.

In addition, with the present exemplary embodiment, the picture data of I frames are recorded intermittently on an optical disk with time intervals corresponding to the periodicity, whereby the I frames are located, i.e., intervals equal to or an integral multiple of the periodicity of the I frame. Instead of the above, the number of arrivals of I frame is counted and every time, when the above number of arrivals reaches a predetermined count number, the picture data of I frames can also be recorded intermittently on the optical disk.

Data of moving pictures recorded on rigid platters by the use of a time lapse recording/reproducing device shown in the exemplary embodiment of FIG. 1 are reproduced in a hard disk drive 12 of FIG. 1, expanded in a JPEG compression/expansion circuit 11 and outputted from an input/output circuit 10, thereby returning to video image signals that are not data compressed. Also, the data intermittently recorded on an optical disk are reproduced in an optical disk drive 13 of FIG. 1, expanded in the JPEG compression/expansion circuit 11 and outputted form the input/output circuit 10, thereby returning to intermittent video image signals that are not data compressed and not continuous like moving pictures.

Likewise, the data of moving pictures recorded on rigid platters by the use of a time lapse recording/reproducing device shown in the exemplary embodiment of FIG. 3 are reproduced in a hard disk drive 12 of FIG. 3, expanded in an MPEG compression/expansion circuit 31 and outputted from the input/output circuit 10, thereby returning to video image signals that are not data compressed. Also, the data intermittently recorded on an optical disk are reproduced in an optical disk drive 13 of FIG. 3, expanded in the MPEG compression/expansion circuit 31 and outputted form the input/output circuit 10, thereby returning to intermittent video image signals that are not data compressed.

What is readily thought of from the detailed description made in the above on the exemplary embodiments of the present invention is that respective video image, data obtained by using a JPEG compression circuit in place of the JPEG compression/expansion circuit in the exemplary embodiment as shown in FIG. 1 and a MPEG compression circuit in place of the MPEG compression/expansion circuit in the exemplary embodiment as shown in FIG. 3 can also be recorded on rigid platters as moving pictures and can be intermittently recorded on an optical disk.

Furthermore, although picture data were recorded intermittently on an optical disk of an optical disk drive in the exemplary embodiments of the present invention as described in detail with reference to Fog. 1 and FIG. 3, it goes without saying that the picture data can also be recorded intermittently on a video tape.

Industrial Applicability

According to the present invention as described in the above, picture data are not only recorded as moving pictures on rigid platters, which has high speed accessibility, but also, when a trigger signal like an alarm signal is inputted, moving pictures of the scenes before and after the trigger signal was inputted can be obtained in the form of recording on the rigid platters for a predetermined length of time together with the video images intermittently recorded on an optical disk.

Therefore, when compared with a prior art-device, which allowed a recording of moving pictures to be performed only after a trigger signal had been inputted, the device prepared according to the present invention can enhance greatly the value in its use in the field of security.

What is claimed is:

1. A recording/reproducing device for time lapse recording/reproducing a video signal comprising:

an input/output circuit for inputting/outputting a video signal;

a picture compression/expansion unit connected to said input/output circuit and provided with a means for intra-frame picture compressing/expanding a video signal inputted through said input/output circuit;

a first recording/reproducing unit provided with a disk like record medium that is connected to said picture compression/expansion unit;

a second recording/reproducing unit connected to said picture compression/expansion unit and provided with a record medium that has the capability of recording for a longer period than the record medium of said first recording/reproducing unit;

a recording control unit to give directions and perform controlling so that a signal fed from said picture compression/expansion unit is recorded as a moving picture on the record medium of said first recording/reproducing unit and at the same time recorded intermittently on the record medium of said second recording/reproducing unit; and an alarm signal generating means for feeding an alarm signal to said recording control unit, wherein said recording control unit has the recording operation of the first recording/reproducing unit terminated after a signal fed from said picture compression/expansion unit has been recorded on the record medium of said first recording/reproducing unit from the time, when an alarm signal from said alarm signal generating means was received, till a certain predetermined time.

2. A recording device for time lapse recording a video signal comprising:

an input circuit for inputting a video signal;

a picture compression unit connected to said input circuit and provided with a means for intra-frame picture compressing a video signal inputted through said input circuit;

a first recording/reproducing unit provided with a disk like record medium that is connected to said picture compression unit;

a second recording/reproducing unit connected to said picture compression unit and provided with a record medium that has the capability of recording for a longer period than the record medium of said first recording/reproducing unit;

a recording control unit to give directions and perform controlling so that a signal fed from said picture compression unit is recorded as a moving picture on the record medium of said first recording/reproducing unit and at the same time recorded Intermittently on the record medium of said second recording/reproducing unit; and an alarm signal generating means for feeding an alarm signal to said recording control unit, wherein said recording control unit has the recording operation of the first recording/reproducing unit terminated after a signal fed from said picture compression unit has been recorded on a record medium of said first recording unit from the time, when an alarm signal from said alarm signal generating means was received, till a certain predetermined time.

3. The recording/reproducing device according to claim 1, wherein said picture compression/expansion unit is a picture compression/expansion unit of JPEG system.

4. The recording/reproducing device according to claim 1, wherein said picture compression/expansion unit is a picture compression/expansion unit of MPEG system.

5. The recording device according to claim 2, wherein said picture compression unit is a picture compression unit of JPEG system.

6. The recording device according to claim 2, wherein said picture compression unit is a picture compression unit of MPEG system .

7. The recording/reproducing device according to claim 1 or the recording device according to claim 2, wherein said first recording/reproducing unit is a hard disk drive with rigid platters serving as a record medium.

8. The recording/reproducing device according to claim 1 or the recording device according to claim 2, wherein said second recording/reproducing unit is an optical disk drive with an optical disk serving as a record medium.

9. The recording/reproducing device according to claim 1 or the recording device according to claim 2, wherein said second recording/reproducing unit is a video tape player with a video tape serving as a record medium.

10. The recording/reproducing device according to claim 1 or claim 3, wherein said recording control unit gives directions and performs controlling so that a one frame portion of the signal fed from said picture compression/expansion unit to said second recording/reproducing unit is recorded on the record medium of the second recording/reproducing unit for every periodicity or every time interval corresponding to an integral multiple of the periodicity of the frame synchronization signal fed to said recording control unit.

11. The recording device according to claim 2 or claim 5, wherein said recording control unit gives directions and perform controlling so that a one frame portion of the signal fed from said picture compression unit to said second recording/reproducing unit is recorded on the record medium of the second recording/reproducing unit for every periodicity or every time interval corresponding to an integral multiple of the periodicity of the frame synchronization signal fed to said recording control unit.

12. The recording/reproducing device according to claim 1 or claim 3, wherein said recording control unit gives directions and performs controlling so that the number of arrivals of the frame synchronization signal fed to said recording control unit is counted and a one frame portion of the signal fed from said picture compression/expansion unit to said second recording/reproducing unit is recorded on the record medium of the second recording/reproducing unit for every predetermined number of the arrival count.

13. The recording device according to claim 2 or claim 5, wherein said recording control unit gives directions and performs controlling so that the number of arrivals of the frame synchronization signal fed to said recording control unit is counted and a one frame portion of the signal fed from said picture compression unit to said second recording/reproducing unit is recorded on the record medium of the second recording/reproducing unit for every predetermined number of the arrival count.

14. The recording/reproducing device according to claim 1 or claim 4, wherein said recording control unit gives directions and performs controlling so that, according to the timing information, whereby the I frame is outputted from said picture compression/expansion unit of MPEG system to said recording control unit, the signal of I frame out of the signal fed from said picture compression/expansion unit of MPEG system to said second recording/reproducing unit is recorded on the record medium of the second recording/reproducing unit for every periodicity or for every time interval corresponding to an integral multiple of the periodicity, with which the signal of I frame is arranged.

15. The recording device according to claim 2 or claim 6, wherein said recording control unit gives directions and performs controlling so that, according to the timing information, whereby the I frame is outputted from said picture compression unit of MPEG system to said recording control unit, the signal of I frame out of the signal fed from said picture compression unit of MPEG system to said second recording/reproducing unit is recorded on the record medium of the second recording/reproducing unit for every periodicity or for every time interval corresponding to an integral multiple of the periodicity, with which the signal of I frame is arranged.

16. The recording/reproducing device according to claim 1 or claim 4, wherein said recording control unit gives directions and performs controlling so that, according to the timing information, whereby an I frame is outputted from said picture compression/expansion unit of MPEG system to said recording control unit, the number of arrivals of the I frame out of the signal fed from said picture compression/expansion unit of MPEG system to said second recording/reproducing unit and the I frame signal is recorded on the record medium of the second recording/reproducing unit for every predetermined number of the arrival count.

17. The recording device according to claim 2 or claim 6, wherein said recording control unit gives directions and performs controlling so that, according to the timing information, whereby an I frame is outputted from said picture compression unit of MPEG system to said recording control unit, the number of arrivals of the I frame out of the signal fed from said picture compression unit of MPEG system to said second recording/reproducing unit and the I frame signal is recorded on the record medium of the second recording/reproducing unit for every predetermined number of the arrival count.

18. The recording/reproducing device according to claim 1, wherein said recording control unit performs controlling by giving directions so that a signal fed from said picture compression/expansion unit is recorded on the record medium of said first recording/reproducing unit from the time, when said alarm signal is received, to the time, when said predetermined time reaches one half of the maximum allowable recording time of said first recording/reproducing unit and then the recording operation is ended.

19. The recording device according to claim 2, wherein said recording control unit performs controlling by giving directions so that a signal fed from said picture compression unit is recorded on the record medium of said first recording/reproducing unit from the time, when said alarm signal is received, to the time, when said predetermined time reaches one half of the maximum allowable recording time of said first recording/reproducing unit and then the recording operation is ended.

* * * * *